United States Patent [19]

Vogt et al.

[11] 3,898,211
[45] Aug. 5, 1975

[54] TRIAZINO(4,3-D)(1,4)BENZODIAZEPINE-3,4,7-TRIONES

[75] Inventors: B. Richard Vogt, Yardley, Pa.; Peter C. Wade, Pennington, N.J.

[73] Assignee: E. R. Squibb & Sons, Inc., Princeton, N.J.

[22] Filed: June 26, 1974

[21] Appl. No.: 483,169

Related U.S. Application Data

[63] Continuation-in-part of Ser. No. 404,072, Oct. 5, 1973, abandoned.

[52] U.S. Cl. ............................ 260/239.3 T; 244/249
[51] Int. Cl.² ...................................... C07D 487/04
[58] Field of Search ........................... 260/239.3 T

[56] References Cited
UNITED STATES PATENTS
3,714,178  1/1973  Hester ........................... 260/308 R
3,717,654  2/1973  Hester ........................... 260/308 R

*Primary Examiner*—Henry R. Jiles
*Assistant Examiner*—Robert T. Bond
*Attorney, Agent, or Firm*—Lawrence S. Levinson; Merle J. Smith; Donald J. Barrack

[57] ABSTRACT

Compounds having the structure

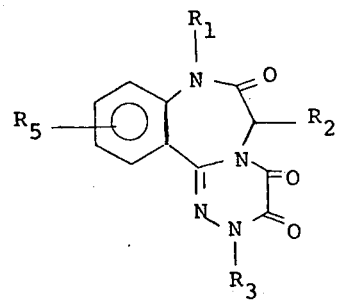

wherein $R_1$ is hydrogen, alkyl, phenyl, or benzyl, $R_2$ is hydrogen or alkyl, $R_3$ is hydrogen or $R_4-(CH_2)_p-$, $R_4$ is amino, alkylamino, dialkylamino, or a nitrogen containing heterocyclic, $R_5$ is hydrogen, halogen, nitro, cyano, trifluoromethyl, alkyl, alkoxy, or alkylthio, and $p$ is 2, 3, or 4, have useful pharmacological activities.

14 Claims, No Drawings

TRIAZINO(4,3-D)(1,4)BENZODIAZEPINE-3,4,7-TRIONES

This is a continuation-in-part of U.S. patent application Ser. No. 404,072, filed Oct. 5, 1973, and now abandoned.

SUMMARY OF THE INVENTION

Compounds having the structure

I

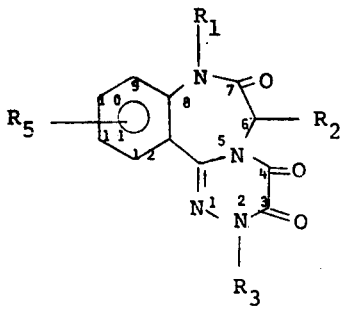

and the pharmaceutically acceptable acid-addition salts thereof, have useful pharmacological activities.

In formula I, and throughout the specification, the symbols are as defined below:

$R_1$ can be hydrogen, alkyl, phenyl, or benzyl;
$R_2$ can be hydrogen or alkyl;
$R_3$ can be hydrogen or $R_4$—$(CH_2)_p$—;
$R_4$ can be amino, alkylamino, dialkylamino, or

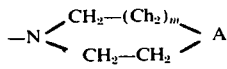

wherein A is CH—Q, oxygen, or N—Q, Q is hydrogen or alkyl, and $m$ is 0 or 1;
$p$ can be 2, 3, or 4; and
$R_5$ can be hydrogen, halogen (preferably fluorine, chlorine or bromine), nitro, cyano, trifluoromethyl, alkyl, alkoxy, or alkylthio.

The term "alkyl" as used throughout the specification, either by itself or as part of a larger group, refers to both straight and branched chain alkyl groups containing 1, 2, 3, or 4 carbon atoms.

The term "alkoxy" as used throughout the specification, refers to compounds of the formula Y—O— wherein y is alkyl as defined above.

The term "halogen" as used throughout the specification, refers to fluorine, chlorine, bromine, and iodine.

Exemplary of the heterocyclic moieties contemplated by the formula

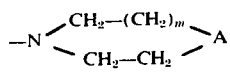

are 1-pyrrolidinyl, 1-piperidinyl, 3-oxazolidinyl, 4-morpholinyl, 1-imidazolidinyl, 1-piperazinyl, 4-alkyl-1-piperazinyl, 3-alkyl-1-imidazolidinyl, 4-alkyl-1-piperidinyl, and 3-alkyl-1-pyrrolidinyl.

Those compounds of formula I wherein $R_3$ is hydrogen are useful as central nervous system depressants.

Those compounds of formula I wherein $R_3$ is other than hydrogen are useful as anti-inflammatory agents.

DETAILED DESCRIPTION OF THE INVENTION

The novel compounds of this invention are produced from compounds having the formula

II

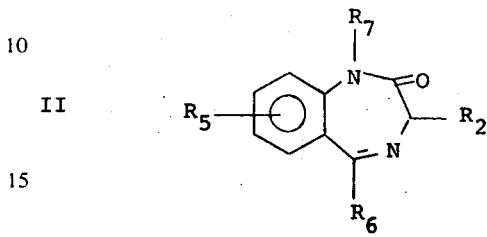

wherein $R_6$ can be halogen (preferably bromine or chlorine), sulfhydryl, alkoxy, alkylthio, or phenylalkylthio and $R_7$ can be alkyl, phenyl, or benzyl. The compounds of formula II are described in U.S. Pat. No. 3,414,563 and Swiss Pat. No. 485,742.

Reaction of a benzodiazepine of formula II with 4-morpholineglyoxylic acid, hydrazide

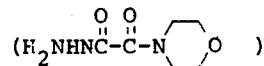

yields a compound having the structure

III

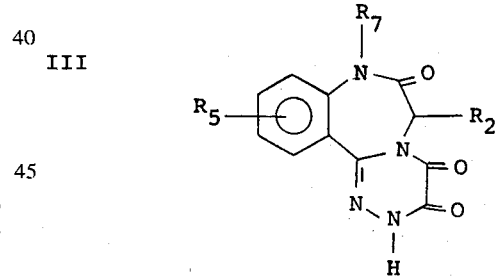

The reaction can be run in a non-reactive polar solvent, e.g., dimethylformamide, n-butanol, etc., at a temperature of about 50°C to 200°C, for about 5 minutes to 24 hours, preferably at from 60°C to 150°C for 10 minutes to 3 hours. The benzodiazepine of formula II and 4-morpholineglyoxylic acid, hydrazide are reacted in approximately a 1:1 molar ratio.

Alternatively, compounds of formula III can be prepared by first reacting a benzodiazepine of formula II with a carbazate having the formula

wherein Z is t-butyl, benzyl, or benzyl substituted with one or more alkoxy or nitro groups, to yield an intermediate having the structure IV 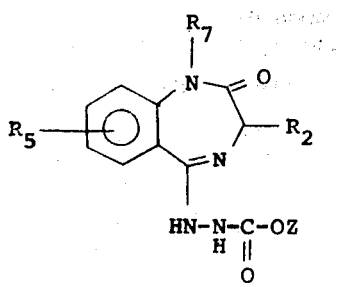

Reaction of a compound of formula IV with an ester of oxalic acid and an alkanol (preferably a lower alcohol having 1, 2, or 3 carbons) and an anhydrous acid (preferably oxalic acid) yields the corresponding compound of formula III. The reaction can be run without a solvent or in a non-reacting organic solvent at a temperature of from about 50°C to 250°C for about 5 minutes to 24 hours, preferably from about 60°C to 150°C for about 30 minutes to 6 hours. The benzodiazepine of formula II, the oxalic acid ester, and the strong acid are used in approximately a 1:1:1 molar ratio.

In order to obtain the triazinobenzodiazepines of formula I wherein $R_3$ is other than hydrogen, a triazinobenzodiazepine of formula III is reacted with an appropriate base, e.g., thallous ethoxide, in approximately a 1:1 molar ratio, to obtain a salt having the structure V 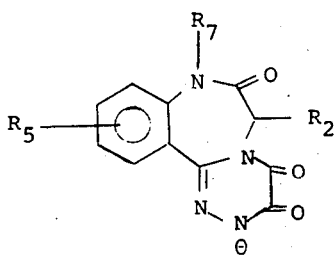

The salt of formula V is subsequently reacted with a compound having the formula $R_4$—$(CH_2)_p$—X wherein X can be chlorine, bromine, iodine, alkylsulfonate (e.g., methanesulfonate) or arylsulfonate (e.g., toluenesulfonate), to obtain a compound having the structure VI 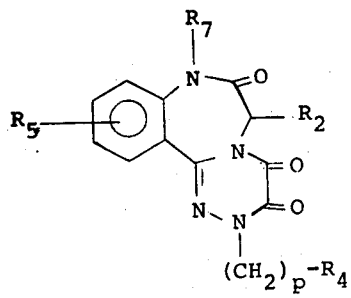

The reaction of a triazinobenzodiazepine of formula III with thallous ethoxide is run in a non-reactive polar solvent, e.g., dimethylformamide at a temperature of from 0°C to 180°C, preferably room temperature, for a period of about 1 minute to 5 hours, preferably for 10 minutes to 1 hour. The reaction of a salt of formula V with a compound of the structure $R_4$—$(CH_2)_p$—X is run at about 50°C to 200°C for a period of about 30 minutes to 48 hours, preferably at 80°C to 140°C for 2 to 24 hours.

Reduction of triazinobenzodiazepines of formula III or VI, wherein $R_7$ is benzyl, to yield compounds having the structure VII 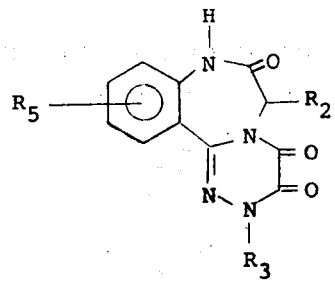

can be accomplished by reacting the compound with hydrogen under pressure in the presence of a catalyst, e.g., palladium or Raney nickel, or by reacting the compound with anhydrous, liquid hydrofluoric acid.

Compounds of formula I wherein $R_2$ is hydrogen are preferred.

Compounds of formula I wherein $R_3$ is $R_4$—$(CH_2)_p$— and $R_4$ is dialkylamino are preferred.

Compounds of formula I wherein $R_5$ is in the 10- or 11-position are preferred, and those wherein $R_5$ is in the 11-position are particularly preferred. Compounds of formula I wherein $R_5$ is halogen are preferred, chlorine being the most preferred.

Compounds of formula I wherein $R_3$ is $R_4$—$(CH_2)_p$— and p is 2 or 3 are preferred.

The triazinobenzodiazepines of formula I wherein $R_3$ is other than hydrogen form pharmaceutically acceptable acid-addition salts with inorganic and organic acids. These acid-addition salts, in addition to having the useful pharmacological activity of the corresponding free base, frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate acid. Illustrative are the hydrohalides, especially the hydrochloride and hydrobromide with are preferred, sulfate, nitrate, phosphate, tartrate, maleate, fumarate, citrate, succinate, methanesulfonate, benzenesulfonate, toluenesulfonate, and the like.

The triazinobenzodiazepines of formula I wherein $R_3$ is other than hydrogen, and the pharmaceutically acceptable acid-addition salts of the compounds, are useful in treating inflammation in mammalian species, e.g., rats, dogs, cats, monkeys, etc. Joint tenderness and stiffness (in conditions such as rheumatoid arthritis) are relieved by the above described compounds.

The triazinobenzodiazepines of formula I wherein $R_3$ is hydrogen are useful as central nervous system depressants and may be used as sedatives and tranquilizers for the relief of anxiety and tension states in mammalian species, e.g., mice, dogs, etc., in the same manner as chlordiazepoxide.

The compounds of this invention are formulated for use as anti-inflammatory agents, sedatives, or tranquilizers according to accepted pharmaceutical practice in oral dosage forms such as tablets, capsules, elixirs, or powders, or in an injectable form in a sterile aqueous vehicle prepared according to conventional pharmaceutical practice. The compounds of this invention may be administered in amounts of 100 mg/70kg/day to 2 g/70kg/day, preferably 100mg/70kg/day to 1g/70kg/day.

The following examples are specific embodiments of this invention.

EXAMPLE 1

11-Chloro-2,8-dihydro-8-methyl-as-triazino-[4,3-d][1,4]benzodiazepine-3,4,7(6H)-trione 5,7-Dichloro-1-methyl-1,4-benzodiazepinone-2 (20 grams, 0.08 moles) and 4-morpholineglyoxylic acid, hydrazide (15 grams, 0.088 mole) are mixed together in 300 milliliters of dimethylformamide for 30 minutes while heating at 100°C. The solvent is stripped off and 400 milliliters of absolute ethanol is added to the residue. A precipitate forms and the mixture is stirred overnight. The precipitate is filtered off and stirred in 200 milliliters of water for 2 hours at room temperature. The solid material is filtered off and digested for 1 hour as a slurry in 2 liters of absolute ethanol. While still hot, the mixture is filtered and 11-chloro-2,8-dihydro-8-methyl-as-triazino[4,3-d][1,4]-benzodiazepine-3,4,7(6H)-trione (the filter cake) is dried under vacuum at 120°C for 4 hours. The product has an indistinct melting point; partial melting and decomposition occur from 342°C to 365°C, where complete melting and decomposition occur.

Anal. Calc'd for $C_{12}H_9ClN_4O_3$:
C, 49.25; H, 3.11; N, 19.14; Cl, 12.11.
Found: C, 49.14; H, 3.41; N, 19.41; Cl, 11.90.

EXAMPLE 2

11-Chloro-2-[2-(dimethylamino)ethyl]-2,8-dihydro-8-methyl-as-triazino[4,3-d][1,4]benzodiazepine-3,4,7(6H)-trione 11-Chloro-2,8-dihydro-8-methyl-as-triazino[4,3-d]-[1,4]benzodiazepine-3,4,7(6H)-trione (5 grams, 0.017 mole, prepared as described in Example 1) is suspended in 100 milliliters of tetrahydrofuran. Thallous ethoxide (4.25 grams, 0.017 mole) is added to the suspension and stirred for 1 hour at room temperature. The mixture is filtered and the filter cake is stirred with ether for 15 minutes. The mixture is filtered and the filter cake is dried under vacuum at room temperature for 1 hour.

The thallous salt is suspended in 200 milliliters of refluxing toluene and treated with 2-(dimethylamino)ethyl chloride. [The dimethylaminoethyl chloride is prepared from dimethylaminoethyl chloride.HCl (4 grams) by first neutralizing the hydrochloride with aqueous potassium hydroxide and then immediately extracting the free base into 75 milliliters of toluene (three 25 milliliters portions).] The thallous salt and dimethylaminoethyl chloride are refluxed for 3 hours and then an additional batch of 2-(dimethylamino)ethyl chloride (equal in amount to the first batch) is added to the reaction mixture and refluxed for 4 hours.

The hot solution is filtered through Celite and the toluene is then stripped off. The residue is taken up in a small amount of chloroform and washed through a 3.5 × 10 cm. column of neutral alumina with 400 milliliters of a mixture of chloroform, ethylacetate, and ethanol (5:4:1). The solvents are stripped off and the residue is recrystallized twice from methanol to yield 1.5 grams of 11-chloro-2-[2-(dimethylamino)ethyl]-2,8-dihydro-8-methyl-as-triazino-[4,3-d][1,4]benzodiazepine-3,4,7(6H)-trione, melting point 224°C–225°C with decomposition.

Anal. Calc'd. for $C_{16}H_{18}ClN_5O_3$:
C, 52.82; H, 4.98; N, 19.25; Cl, 9.75.
Found: C, 52.54; H, 4.92; N, 19.13; Cl, 9.53.

EXAMPLE 3

11-Chloro-2-[2-(dimethylamino)ethyl]-2,8-dihydro-8-methyl-as-triazino[4,3-d][1,4]benzodiazepine-3,4,7(6H)-trione, hydrochloride (1:1)

To a suspension of 11-chloro-2-[2-(dimethylamino)ethyl]-2,8-dihydro-8-methyl-as-triazino[4,3-d][1,4]benzodiazepine-3,4,7(6H)-trione (1.7 grams, 0.0047 mole, prepared as described in Example 2) in 20 milliliters of water is added 0.8 milliliter of concentrated hydrochloric acid. The crystals formed are filtered and recrystallized from hot water to yield 1.6 grams of 11-chloro-2-[2-(dimethylamino)ethyl]-2,8-dihydro-8-methyl-as-triazino[4,3-d][1,4]benzodiazepine-3,4,7(6H)-trione, hydrochloride (1:1), melting point 296°C–297°C with decomposition.

Anal. Calc'd. for $C_{16}H_{18}ClN_5O_3 \cdot HCl$:
C, 48.01; H, 4.79; N, 17.50; Cl, 17.72.
Found: C, 47.87; H, 4.65; N, 17.30; Cl, 17.86.

EXAMPLE 4

11-Chloro-2-[3-(dimethylamino)propyl]-2,8-dihydro-8-methyl-as-triazino[4,3-d][1,4]benzodiazepine-3,4,7(6H)-trione, hydrochloride (1:1)

A. 11-Chloro-2-[3-(dimethylamino)propyl]-2,8-dihydro-8-methyl-as-triazino[4,3-d][1,4]benzodiazepine-3,4,7(6H)-trione 11-Chloro-2,8-dihydro-8-methyl-as-triazino[4,3-d]-[1,4]benzodiazepine-3,4,7(6H)-trione (5 grams, 0.017 mole, produced as described in Example 1) is dissolved in 50 milliliters of warm (ca. 70°C) dimethylformamide. Thallous ethoxide (4.25 grams 0.017 mole) is added to the solution. After stirring for 2 hours at room temperature, the solution is diluted with 75 milliliters of ether and the resulting precipitate is filtered off.

The precipitate is dried under vacuum for 2 hours at room temperature and is then suspended in 200 milliliters of refluxing toluene. [3-(Dimethylamino)propyl chloride is prepared from the corresponding hydrochloride salt by neutralizing 4 grams of the hydrochloride salt with aqueous potassium hydroxide and extracting immediately with toluene (four 25 milliliter portions).] 3-(Dimethylamino)propyl chloride is added to the thallous salt suspended in refluxing toluene. Refluxing is continued for 1 hour and a second solution of dimethylaminopropyl chloride (equal in amount to the first) is prepared and added to the refluxing toluene solution; heating is continued overnight.

The hot reaction mixture is filtered through Celite and the filtrate is stripped of solvent. The residue is taken up in a small amount of chloroform and filtered through 6 × 6 cm. column of Florisil with 2 liters of a mixture of chloroform, ethylacetate, and ethanol (5:4:1). The solvents are stripped off and the residue recrystallized from absolute ethanol to give 4.8 grams of 11-chloro-2-[3-(dimethylamino)-propyl]-2,8- dihydro-8-methyl-as-triazino[4,3-d][1,4]benzodiazepine-3,4,7(6H)-trione.

B. 11-Chloro-2-[3-(dimethylamino)propyl]-2,8-dihydro-8-methyl-as-triazino[4,3-d][1,4]benzodiazepine-3,4,7(6H)-trione, hydrochloride (1:1)

4.5 Grams of the free base obtained in part (A) is dissolved in hot absolute ethanol and treated with an excess of ethanolic hydrochloric acid. On cooling the solution, 11-chloro-2-[3-(dimethylamino)propyl]-2,8-dihydro-8-methyl-as-triazino[4,3-d][1,4]benzodiazepine-3,4,7(6H)-trione, hydrochloride (1:1) precipitates. The salt is filtered off and dried under vacuum at 100°C for 2 hours to yield 4.6 grams of product, melting point 233°C–238°C.

Anal. Calc'd. for $C_{17}H_{21}Cl_2N_5O_3$:
C, 49.28; H, 5.11; N, 16.91; Cl, 17.12.
Found: C, 49.13; H, 5.10; N, 16.85; Cl, 16.87.

EXAMPLE 5

11-Chloro-2-[2-(diethylamino)ethyl]-2,8-dihydro-8-methyl-as-triazino[4,3-d][1,4]benzodiazepine-3,4,7(6H)-trione, hydrochloride (1:1)

A solution of 11-chloro-2,8-dihydro-8-methyl-as-triazino[4,3-d][1,4]benzodiazepine-3,4,7(6H)-trione (10 grams, 0.034 mole, prepared as described in Example 1) in 140 milliliters of dimethylformamide is treated with thallous ethoxide at room temperature. After 2 hours, 300 milliliters of ether is added and the thallous salt is filtered and dried in vacuo at room temperature for 2 hours.

The thallous salt is suspended in 400 milliliters of refluxing toluene and treated with a solution of 2-diethylamino)ethyl chloride. [The 2-(diethylamino)ethyl chloride is prepared from 11.25 grams of the corresponding hydrochloride by neutralizing the hydrochloride with aqueous potassium hydroxide, extracting the free base with chloroform, and drying the organic phase with molecular sieves.] The suspension is refluxed for 2 hours and then an additional batch of 2-(diethylamino)ethyl chloride (equal in amount to the first batch) is added to the reaction mixture and refluxing is continued for about 15 hours.

The reaction mixture is filtered and the solvent evaporated to yield 12.7 grams of solid, which is crystallized twice from methanol to give 9.6 grams of material, melting point 260°C-262°C with decomposition. This material is suspended in water and dissolved by the addition of dilute hydrochloric acid. The solution is extracted with chloroform and the aqueous phase is evaporated to yield a solid which is crystallized from 95% ethanol to yield 10.7 grams of 11-chloro-2-[2-(diethylamino)ethyl]-2,8-dihydro-8-methyl-as-triazino[4,3-d][1,4]benzodiazepine-3,4,7(6H)-trione, hydrochloride (1:1), melting point 265°C–266°C with decomposition.

Anal. Calc'd. for $C_{18}H_{22}ClN_5O_3 \cdot HCl$:
C, 50.48; H, 5.42; N, 16.35; Cl, 16.52.
Found: C, 50.76; H, 5.53; N, 16.37; Cl, 16.51.

EXAMPLE 6

11-Chloro-2,8-dihydro-8-methyl-2-[2-(1-pyrrolidinyl)ethyl]-as-triazino[4,3-d][1,4]benzodiazepine-3,4,7-(6H)-trione, hydrochloride (1:1)

A solution of 11-chloro-2,8-dihydro-8-methyl-as-triazino[4,3-d][1,4]benzodiazepine-3,4,7(6H)-trione (10 grams, 0.034 mole, prepared as described in Example 1) in 140 milliliters of dimethylformamide is treated with thallous ethoxide (8.5 grams, 0.034 mole) at room temperature. After 2 hours 200 milliliters of ether is added and the thallous salt that precipitates is filtered and dried in vacuo for 2 hours at room temperature.

The thallous salt is suspended in 400 milliliters of refluxing toluene and treated with 2-chloroethyl pyrrolidine. [The 2-chloroethyl pyrrolidine is prepared from 11.05 grams of the corresponding hydrochloride by neutralizing the hydrochloride with aqueous potassium hydroxide, extracting the free base with chloroform and drying the organic phase with molecular sieves]. The reaction mixture is refluxed for 2 hours and then an additional batch of 2-chloroethyl pyrrolidine (equal in amount to the first batch) is added and refluxing is continued for about 15 hours. The reaction mixture is filtered and the solvent evaporated in vacuo to yield a solid that is triturated with ether and dried. The solid is dissolved in 2N hydrochloric acid and washed with dichloromethane. The aqueous solution is evaporated in vacuo. Crystallization of the remaining solid from absolute ethanol yields 8.0 grams of 11-chloro-2,8-dihydro-8-methyl-[2-(1-pyrrolidinyl)ethyl]-as-triazino[4,3-d][1,4]benzodiazepine-3,4,7(6H)-trione, hydrochloride (1:1), melting point 300°C–303°C with decomposition.

Anal. Calc'd for $C_{18}H_{20}ClN_5O_3 \cdot HCL$:
C, 50.72; H, 4.97; N, 16.43; Cl, 16.63.
Found: C, 50.86; H, 5.27; N, 16.57; Cl, 16.52.

EXAMPLE 7

11-Chloro-2,8-dihydro-8-methyl-2-[2-(4-morpholinyl)-ethyl]-as-triazino[4,3-d][1,4]benzodiazepine-3,4,7-(6H)-trione, hydrochloride (1:1)

A solution of 11-chloro-2,8-dihydro-8-methyl-as-triazino[4,3-d][1,4]benzodiazepine-3,4,7(6H)-trione (10 grams, 0.034 mole, prepared as described in Example 1) in 140 milliliters of dimethylformamide is treated with thallous ethoxide (8.5 grams) at room temperature. After 2 hours, 300 milliliters of ether is added and the thallous salt that precipitates is filtered and dried in vacuo at room temperature.

The thallous salt is suspended in 400 milliliters of refluxing toluene and 2-chloroethyl morpholine (prepared from 12.1 grams of the corresponding hydrochloride by neutralizing the hydrochloride with aqueous potassium hydroxide, extracting the free base into chloroform and drying the organic phase with molecular sieves) is added. Refluxing is continued for 2 hours followed by the addition of a second batch of 2-chloroethyl morpholine (equal in amount to the first batch). Refluxing is continued for about 15 hours.

The reaction mixture is filtered and the solvent evaporated to yield 19 grams of solid that is dissolved in chloroform, applied to a 400 gram column of neutral alumina (Activity I) and eluted with 800 milliliters of chloroform/ethyl acetate/absolute ethanol (5:4:1). The 11 grams of solid obtained is dissolved in 2N hydrochloric acid and extracted with dichloromethane. The aqueous solution is evaporated to a solid in vacuo and crystallized from 95% ethanol to yield 7.5 grams of 11-chloro-2,8-dihydro-8-methyl-2-[2-(4-morpholinyl)ethyl]-as-triazino[4,3-d][1,4]benzodiazepine-3,4,7(6H)-trione, hydrochloride (1:1).

Anal. Calc'd for $C_{18}H_{20}ClN_5O_4 \cdot HCl$:
C, 48.88; H, 4.79; N, 15.83; Cl, 16.03.
Found: C, 48.64; H, 5.05; N, 15.68; Cl, 16.13.

EXAMPLES 8 – 16

Following the procedure of Example 1, but substituting the compounds indicated in column I below for 5,7-dichloro-1-methyl-1,4-benzodiazepinone-2, the compounds indicated in column II are obtained.

| Example | Column I | Column II |
|---|---|---|
| 8 | 5-chloro-1-benzyl-7-(trifluoromethyl)-1,4-benzodiazepinone-2. | 2,8-dihydro-8-benzyl-11-(trifluoromethyl)-as-triazino[4,3-d][1,4]benzodiazepine-3,4,7(6H)-trione. |
| 9 | 5-chloro-1-methyl-7-nitro-1,4-benzodiazepinone-2. | 2,8-dihydro-8-methyl-11-nitro-as-triazino-[4,3-d][1,4]benzodiazepine-3,4,7(6H)-trione. |
| 10 | 5-chloro-7-ethylthio-1-methyl-1,4-benzodiazepinone-2. | 2,8-dihydro-8-methyl-11-(ethylthio)-as-triazino[4,3-d][1,4]benzodiazepine-3,4,7-(6H)-trione. |
| 11 | 5-chloro-1,7-dimethyl-1,4-benzodiazepinone-2. | 2,8-dihydro-8,11-dimethyl-as-triazino[4,3-d]-[1,4]benzodiazepine-3,4,7(6H)-trione. |
| 12 | 5-chloro-1,3-dimethyl-7-(trifluoromethyl)-1,4-benzodiazepinone-2. | 2,8-dihydro-6,8-dimethyl-11-(trifluoromethyl)-as-triazino[4,3-d][1,4]benzodiazepine-3,4,7-(6H)-trione. |
| 13 | 8-bromo-5-ethoxy-1-phenyl-1,4-benzodiazepinone-2. | 10-bromo-2,8-dihydro-8-phenyl-as-triazino-[4,3-d][1,4]benzodiazepine-3,4,7(6H)-trione. |
| 14 | 7-cyano-1-benzyl-5-(methylthio)-1,4-benzodiazepinone-2. | 11-cyano-2,8-dihydro-8-benzyl-as-triazino-[4,3-d][1,4]benzodiazepine-3,4,7(6H)-trione. |
| 15 | 1-benzyl-7-chloro-1,4-benzodiazepin-2-one-5-thione. | 8-benzyl-11-chloro-2,8-dihydro-as-triazino-[4,3-d][1,4]benzodiazepine-3,4,7(6H)-trione. |
| 16 | 5-chloro-1-phenyl-7-ethyl-1,4-benzodiazepinone-2. | 8-phenyl-11-ethyl-2,8-dihydro-as-triazino-[4,3-d][1,4]benzodiazepine-3,4,7(6H)-trione. |

EXAMPLES 17 – 21

Following the procedure of Example 4a, but substituting the compounds indicated in column I below for 3-(dimethylamino)-propyl chloride, the compounds indicated in column II are obtained.

| Example | Column I | Column II |
|---|---|---|
| 17 | N-(3-chloropropyl)pyrrolidine. | 11-chloro-2-[3-(1-pyrrolidinyl)]propyl]-2,8-dihydro-8-methyl-as-triazino[4,3-d]-[1,4]benzodiazepine-3,4,7(6H)-trione. |
| 18 | N-(3-chloropropyl)piperidine. | 11-chloro-2-[3-(1-piperidinyl)propyl]-2,8-dihydro-8-methyl-as-triazino[4,3-d]-[1,4]benzodiazepine-3,4,7(6H)-trione. |
| 19 | 1-(2-chloroethyl)-4-methyl-piperazine. | 11-chloro-2-[2-(4-methyl-1-piperazinyl)-ethyl]-2,8-dihydro-8-methyl-as-triazino-[4,3-d][1,4]benzodiazepine-3,4,7(6H)-trione. |
| 20 | 3-aminopropyl chloride. | 11-chloro-2-[3-(amino)propyl]-2,8-dihydro-8-methyl-as-triazino[4,3-d][1,4]benzodiazepine-3,4,7(6H)-trione. |
| 21 | 3-(ethylamino)propyl chloride. | 11-chloro-2-[3-(ethylamino)propyl]-2,8-dihydro-8-methyl-as-triazino[4,3-d][1,4]-benzodiazepine-3,4,7(6H)-trione. |

EXAMPLES 22 – 27

Following the procedure of Example 4a, but substituting the compounds indicated in column I below for 3-(dimethylamino)propyl chloride and the compounds indicated in column II below for 11-chloro-2,8-dihydro-8-methyl-as-triazino[4,3-d][1,4]benzodiazepine-3,4,7(6H)-trione, the compounds indicated in column III are obtained.

The starting materials in column II are obtained using the procedure of examples 9, 13, 14, 8, 16 and 15 respectively.

| Example | Column I | Column II | Column III |
|---|---|---|---|
| 22 | 3-aminopropyl chloride | 11-nitro-2,8-dihydro-8-methyl-as-triazino[4,3-d][1,4]benzodiazepine-3,4,7(6H)-trione. | 11-nitro-2-[3-(amino)propyl]-2,8-dihydro-8-methyl-as-triazino[4,3-d][1,4]benzodiazepine-3,4,7(6H)-trione. |
| 23 | 2-(dimethylamino)-ethyl chloride | 10-bromo-2,8-dihydro-8-phenyl-as-triazino[4,3-d][1,4]benzodiazepine-3,4,7(6H)-trione. | 10-bromo-2-[2-(dimethylamino)-ethyl]-2,8-dihydro-8-phenyl-as-triazino[4,3-d][1,4]benzodiazepine-3,4,7(6H)-trione. |
| 24 | 2-(propylamino)ethyl chloride | 11-cyano-2,8-dihydro-8-benzyl-as-triazino[4,3-d][1,4]benzodiazepine-3,4,7(6H)-trione. | 11-cyano-2-[2-(propylamino)-ethyl]-2,8-dihydro-8-benzyl-as-triazino[4,3-d][1,4]benzodiazepine-3,4,7(6H)-trione. |
| 25 | 2-aminoethyl chloride | 11-(trifluoromethyl)-2,8-dihydro-8-benzyl-as-triazino- | 11-(trifluoromethyl)-2-[2-(amino)-ethyl[-2,8-dihydro-8-benzyl-as- |

CONTINUED

| Example | Column I | Column II | Column III |
|---|---|---|---|
| | | [4,3-d][1,4]benzodiazepine-3,4,7(6H)-trione. | triazino[4,3-d][1,4]benzodiazepine-3,4,7(6H)-trione. |
| 26 | 2-(methylamino)ethyl chloride | 11-ethyl-2,8-dihydro-8-phenyl-as-triazino[4,3-d][1,4]benzodiazepine-3,4,7(6H)-trione. | 11-ethyl-2-[2-(methylamino)-ethyl]-2,8-dihydro-8-phenyl-as-triazino[4,3-d][1,4]benzodiazepine-3,4,7(6H)-trione. |
| 27 | 2-(dimethylamino)-ethyl chloride | 11-chloro-2,8-dihydro-8-benzyl-as-triazino[4,3-d]-[1,4]benzodiazepine-3,4,7-(6H)-trione. | 11-chloro-2-[2-(dimethylamino)-ethyl]-2,8-dihydro-8-benzyl-as-triazino[4,3-d][1,4]benzodiazepine-3,4,7(6H)-trione. |

EXAMPLE 28

11-Chloro-2-[3-(dimethylamino)propyl]-2,8-dihydro-as-triazino[4,3-d][1,4]benzodiazepine-3,4,7(6H)-trione A. 11-Chloro-2,8-dihydro-8-benzyl-as-triazino[4,3-d][1,4]benzodiazepine-3,4,7(6H)-trione 5,7-Dichloro-1-benzyl-1,4-benzodiazepinone-2 (0.10 moles) and 4-morpholineglyoxylic acid, hydrazide (0.11 mole) are mixed together in 400 milliliters of dimethylformamide for 30 minutes while heating at 100°C to yield 11-chloro-2,8-dihydro-8-benzyl-as-triazino[4,3-d][1,4]benzodiazepine-3,4,7(6H)-trione.

B. 11-Chloro-2-[3-(dimethylamino)propyl]-2,8-dihydro-8-benzyl-as-triazino[4,3-d][1,4]benzodiazepine-3,4,7(6H)-trione 11-Chloro-2,8-dihydro-8-benzyl-as-triazino[4,3-d][1,4]benzodiazepine-3,4,7(6H)-trione (0.02 mole) is suspended in 100 milliliters of tetrahydrofuran. Thallous ethoxide (0.02 mole) is added to the suspension and stirred for 1 hour at room temperature to give the salt.

The salt is suspended in 200 milliliters of refluxing toluene and treated with 3-(dimethylamino)propyl chloride. Refluxing is continued for 3 hours followed by filtering of the hot solution, evaporation of the filtrate, washing of the residue and recrystallizing of 11-chloro-2-[3-(dimethylamino)propyl]-2,8-dihydro-8-benzyl-as-triazino[4,3-d][1,4]benzodiazepine-3,4,7(6H)-trione.

C. 11-Chloro-2-[3-(dimethylamino)propyl]-2,8-dihydro-as-triazino[4,3-d][1,4]benzodiazepine-3,4,7(6H)-trione 11-Chloro-2-[3-(dimethylamino)propyl]-2,8-dihydro-8-benzyl-as-triazino[4,3-d][1,4]benzodiazepine-3,4,7(6H)-trione (0.01 mole) is hydrogenated at 60°C in 300 milliliters of acetic acid containing 0.3 g of pre-reduced Raney nickel. The initial hydrogen pressure is 60 p.s.i. The reduction is stopped after 0.01 mole of hydrogen is absorbed, the catalyst is filtered off, and the solvent is evaporated. The residue is stirred with water and 11-chloro-2-[3-(dimethylamino)propyl]-2,8-dihydro-as-triazino[4,3-d][1,4]benzodiazepine-3,4,7(6H)-trione is filtered off and dried.

EXAMPLES 29 – 32

Following the procedure of Example 28, but substituting the compound indicated in column I below for 5,7-dichloro-1-benzyl-1,4-benzodiazepinone-2 and the compound indicated in column II below for 3-(dimethylamino)-propyl chloride, the compound indicated in column III below is obtained.

| Example | Column I | Column II | Column III |
|---|---|---|---|
| 29 | 5-chloro-1-benzyl-7-(trifluoromethyl)-1,4-benzodiazepinone-2 | N-(2-chloroethyl)pyrrolidine | 2-[2-(1-pyrrolidinyl)ethyl]-2,8-dihydro-11-(trifluoromethyl)-as-triazino[4,3-d]-[1,4]benzodiazepine-3,4,7-(6H)-trione |
| 30 | 5-chloro-1-benzyl-7-(methoxy)-1,4-benzodiazepinone-2 | 2-aminoethyl chloride | 2-[2-(amino)ethyl]-2,8-dihydro-11-(methoxy)-as-triazino[4,3-d]-[1,4]benzodiazepine-3,4,7(6H)-trione |
| 31 | 5-chloro-1-benzyl-3,7-dimethyl-1,4-benzodiazepinone-2 | 3-(methylamino)-propyl chloride | 2-[3-(methylamino)propyl]-2,8-dihydro-6,11-dimethyl-as-triazino[4,3-d][1,4]benzodiazepine-3,4,7(6H)-trione |
| 32 | 5-chloro-1-benzyl-1,4-benzodiazepinone-2 | 2-(isobutylamino)-ethyl chloride | 2-[2-(isobutylamino)ethyl]-2,8-dihydro-as-triazino[4,3-d][1,4]-benzodiazepine-3,4,7(6H)-trione |

What is claimed is:

1. A compound having the formula

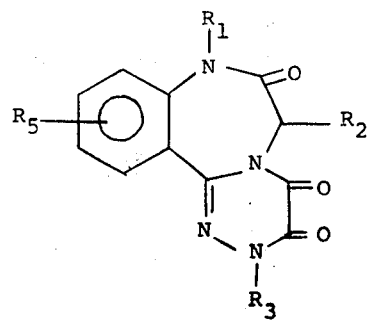

wherein $R_1$ is hydrogen, alkyl, phenyl or benzyl; $R_2$ is hydrogen or alkyl; $R_3$ is hydrogen or $R_4—(CH_2)_p—$; $R_4$ is amino, alkylamino, dialkylamino or

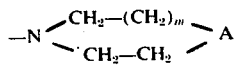

wherein A is CH—Q, oxygen or N—Q, Q is hydrogen or alkyl and $m$ is 0 or 1; p is 2, 3 or 4; and $R_5$ is hydrogen, halogen, nitro, cyano, trifluoromethyl, alkyl, alkoxy or alkylthio; wherein alkyl refers to alkyl groups having 1 to 4 carbon atoms and alkoxy refers to alkoxy groups having 1 to 4 carbon atoms; or when $R_3$ is other than hydrogen, a pharmaceutically acceptable acid addition salt thereof.

2. A compound in accordance with claim 1 wherein $R_3$ is hydrogen.

3. A compound in accordance with claim 1 wherein $R_3$ is $R_4—(CH_2)_p—$.

4. A compound in accordance with claim 3 wherein $R_4$ is amino, alkylamino or dialkylamino.

5. A compound in accordance with claim 3 wherein $R_4$ is

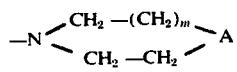

6. A compound in accordance with claim 1 wherein $R_1$ is alkyl.

7. The compound in accordance with claim 1 having the name 11-chloro-2,8-dihydro-8-methyl-as-triazino[4,3-d][1,4]benzodiazepine-3,4,7(6H)-trione.

8. The compound in accordance with claim 1 having the name 11-chloro-2-[2-(dimethylamino)ethyl]-2,8-dihydro-8-methyl-as-triazino[4,3-d][1,4]benzodiazepine-3,4,7(6H)-trione.

9. The compound in accordance with claim 1 having the name 11-chloro-2-[3-(dimethylamino)propyl]-2,8-dihydro-8-methyl-as-triazino[4,3-d][1,4]benzodiazepine-3,4,7(6H)-trione.

10. The compound in accordance with clainm 1 having the name 11-chloro-2-[3-(dimethylamino)propyl]-2,8-dihydro-8-methyl-as-triazino[4,3-d][1,4]benzodiazepine-3,4,7(6H)-trione, hydrochloride.

11. The compound in accordance with claim 1 having the name 11-chloro-2-[2-(dimethylamino)ethyl]-2,8-dihydro-8-methyl-as-triazino[4,3-d][1,4]benzodiazepine-3,4,7(6H)-trione, hydrochloride.

12. The compound in accordance with claim 1 having the name 11-chloro-2-[2-(diethylamino)ethyl]2,8-dihydro-8-methyl-as-triazino[4,3-d][1,4]benzodiazepine-3,4,7(6H)-trione, hydrochloride.

13. The compound in accordance with claim 1 having the name 11-chloro-2,8-dihydro-8-methyl-2-[2-(1-pyrrolidinyl)-ethyl]-as-triazino[4,3-d][1,4]benzodiazepine-3,4,7(6H)-trione, hydrochloride.

14. The compound in accordance with claim 1 having the name 11-chloro-2,8-dihydro-8-methyl-2-[2-(4-morpholinyl)-ethyl]-as-triazino]4,3-d][1,4]benzodiazepine-3,4,7(6H)-trione, hydrochloride.

* * * * *

UNITED STATES PATENT AND TRADEMARK OFFICE
CERTIFICATE OF CORRECTION

PATENT NO. : 3,898,211
DATED : August 5, 1975
INVENTOR(S) : B. Richard Vogt and Peter C. Wade It is certified that error appears in the above–identified patent and that said Letters Patent are hereby corrected as shown below:

Column 8, line 23, "dihydro-8-methyl-" should read --dihydro-8-methyl-2- --.

Signed and Sealed this eleventh Day of November 1975

[SEAL]

Attest:

RUTH C. MASON
*Attesting Officer*

C. MARSHALL DANN
*Commissioner of Patents and Trademarks*